US012711284B2

(12) United States Patent
Venkatesh et al.

(10) Patent No.: US 12,711,284 B2
(45) Date of Patent: Aug. 18, 2026

(54) PREVENTING AI ENGINEERED PASSWORD COMPROMISES ORIGINATING FROM KEYSTROKE RHYTHMS

(71) Applicant: Dell Products L.P., Round Rock, TX (US)

(72) Inventors: Karthik Venkatesh, Bangalore (IN); Vivek Sundaresan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 18/677,652

(22) Filed: May 29, 2024

(65) Prior Publication Data

US 2025/0371200 A1 Dec. 4, 2025

(51) Int. Cl.

*G06F 21/83* (2013.01)
*G06F 3/16* (2006.01)
*G06F 21/55* (2013.01)
*G06V 30/412* (2022.01)
*G06V 30/42* (2022.01)
*G10K 11/175* (2006.01)
*H04L 65/1089* (2022.01)

(52) U.S. Cl.

CPC .............. *G06F 21/83* (2013.01); *G06F 3/165* (2013.01); *G06F 21/554* (2013.01); *G06V 30/412* (2022.01); *G06V 30/42* (2022.01); *G10K 11/1752* (2020.05); *H04L 65/1089* (2013.01); *G06F 2221/031* (2013.01)

(58) Field of Classification Search

None

See application file for complete search history.

(56) References Cited

U.S. PATENT DOCUMENTS 6,798,887 B1 * 9/2004 Andre ...................... G06F 21/83 381/1
7,705,829 B1 * 4/2010 Plotnikov ............. G06F 3/0236 380/52

(Continued)

OTHER PUBLICATIONS

This AI Model Can Steal Passwords by 'Listening' to the Keyboard, Here's How, The Times of India, Aug. 17, 2023, pp. 1-2.

*Primary Examiner* — Scott B Christensen
(74) *Attorney, Agent, or Firm* — Workman Nydegger

(57) ABSTRACT

One example method includes automatically determining, at a keyboard sound mitigation model implemented on a first computing system, if the first computing system is actively running a video communication service during a video communication session with a second computing system; in response to determining that the first computing system is actively running the video communication service during the video communication session with a second computing system, automatically determining, by the keyboard sound mitigation model, if a user of the first computing system is entering a password or sensitive information into a webpage or window that is active on the first computing system; and in response to determining that the user of the first computing system is entering the password or the sensitive information, performing, by the keyboard sound mitigation model, a keyboard sound mitigation operation that masks or removes any keyboard sounds made while entering the password or sensitive information.

20 Claims, 5 Drawing Sheets

(56) References Cited

U.S. PATENT DOCUMENTS

2012/0128146 A1* 5/2012 Boss ..................... H04M 3/564
379/202.01
2022/0121776 A1* 4/2022 Johnston ............... G06F 21/554
2024/0070312 A1* 2/2024 Kwok ................. G06F 21/6245
2024/0179194 A1* 5/2024 Jaiswal ................. H04L 65/403
2024/0319772 A1* 9/2024 Mishra ................. G03B 11/043

* cited by examiner

PREVENTING AI ENGINEERED PASSWORD COMPROMISES ORIGINATING FROM KEYSTROKE RHYTHMS

COPYRIGHT AND MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNOLOGICAL FIELD OF THE DISCLOSURE

Embodiments disclosed herein generally relate to computing system security. More particularly, at least some embodiments relate to systems, hardware, software, computer-readable media, and methods for providing a computing system defense mechanism for protecting against the stealing of keystrokes used for password entry or other sensitive information entry.

BACKGROUND

Computing system security is a constant need for users of computing systems. In particular, the with the increasing use of Artificial Intelligence (AI) tools, the need for increased computing system security has never been greater. For example, recent findings reveal that AI tools can proficiently "capture" the acoustic patterns of keyboard typing sounds, effectively learning the password input pattern for the keyboard typing sounds. Thus, an acoustic side-channel attack poses a potential threat to a user's password security.

In one recent study, machine learning algorithms were used to create a system able to identify which keys were being pressed on a laptop based on sound. This is an approach that researchers deployed on the Enigma cipher device in recent years. The study reports how the researchers pressed each of 36 keys on a MacBook Pro, including all the letters and numbers, 25 times in a row, using different fingers and with varying pressure. The sounds were recorded both using a video communication service and on a smartphone placed at a short distance from the keyboard. The researchers were thus able to use the keyboard sounds to determine a pattern of input from which passwords and other related sensitive information could be replicated.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
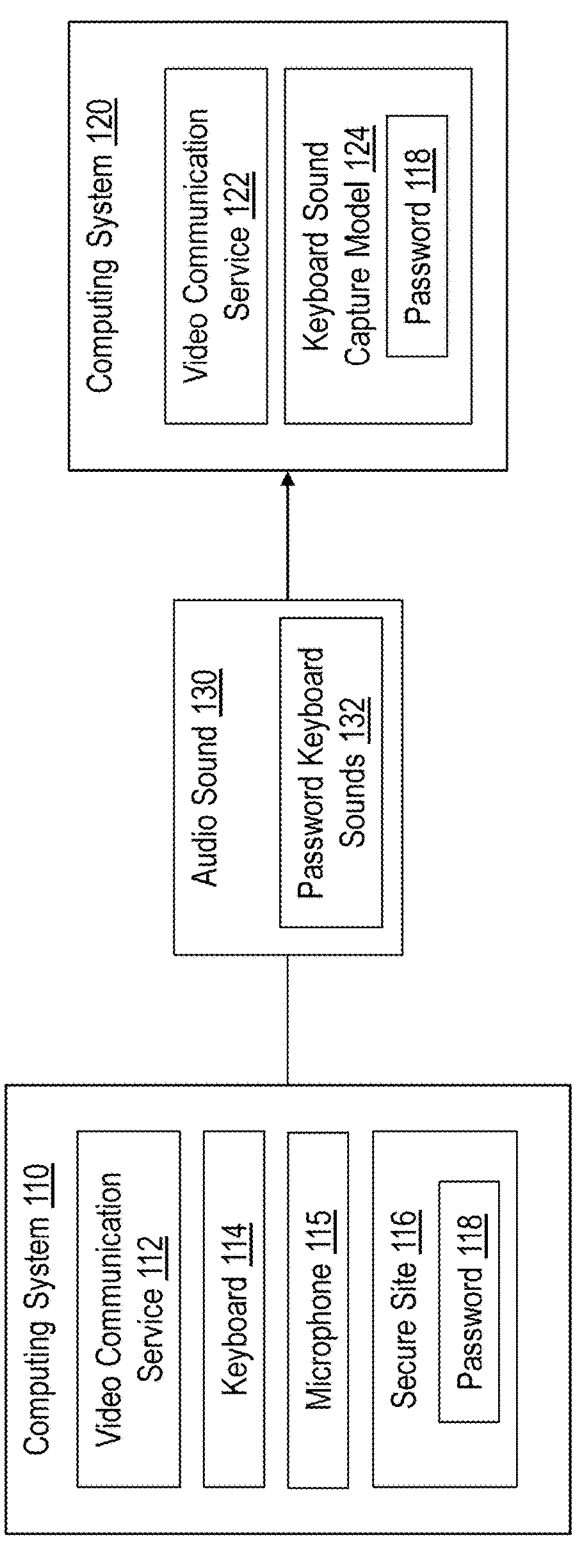
FIG. 1 discloses aspects of two computing systems involved in a video communication session.

Embodiments disclosed herein generally relate to computing system security. More particularly, at least some embodiments relate to systems, hardware, software, computer-readable media, and methods for providing a computing system defense mechanism for protecting against the stealing of keystrokes used for password entry or other sensitive information entry.

One example method includes automatically determining, at a keyboard sound mitigation model implemented on a first computing system, if the first computing system is actively running a video communication service during a video communication session with a second computing system; in response to determining that the first computing system is actively running the video communication service during the video communication session with a second computing system, automatically determining, by the keyboard sound mitigation model, if a user of the first computing system is entering a password or sensitive information into a webpage or window that is active on the first computing system; and in response to determining that the user of the first computing system is entering the password or the sensitive information, performing, by the keyboard sound mitigation model, a keyboard sound mitigation operation that masks or removes any keyboard sounds made while entering the password or sensitive information.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In particular, the embodiments disclosed herein provide improvements to the operating of the computing system. For example, it would be possible for a user to manually mute a microphone or use a push-to-talk feature to help prevent the capture of keyboard sounds when entering a password or sensitive information. However, manually muting the microphone requires the user to remember to mute every time the password or sensitive information is entered and then to unmute whenever he or she wants to speak again. This is burdensome to the user and requires computing resources to constantly manually mute and unmute. Likewise, the push-to-talk feature requires that the user manually push a certain key to activate the microphone when speaking. This leads to less fluid conversation and part of the user's speaking can be missed. Again, this is burdensome to the user and requires computing resources. The embodiments herein automatically provide a computing system defense mechanism for protecting against the stealing of keystrokes used for password entry or other sensitive information entry. This provides for enhanced user experience and saves on computing resources as the computing system is best able to allocate resources to perform the automatic operations.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

FIG. 1 illustrates a computing environment 100 that includes a computing system 110 and a computing system 120, which may be any reasonable computing systems. The computing system 110 includes a video communication service 112, which allows the computing system 110 to participate in a video communication session with the computing system 120 or other computing systems when implementing a video communication service. The video communication service may be Microsoft Teams, Zoom, Cisco Webex, Slack, Facebook Messenger, Apple Facetime, Goggle Meet, or any other reasonable video communication service. Accordingly, the embodiments disclosed herein are not limited to any particular video communication service implemented by the video communication service 112. The computing system 120 includes a video communication service 122, which allows the computing system 120 to participate in the video communication session with the computing system 120 when implementing a video communication service that is also being implemented by the video communication service 112.

The computing system 110 also includes a keyboard 114 that allows a user of the computing system 110 to input data into the computing system, such as a password 118. A microphone 115 allows the user of the computing system 110 to speak to a user of the computing system 120 during the video communication session. The keyboard 114 and the microphone 115 may be any reasonable keyboard and microphone.

During the video communication session between the user of the computing system 110 and the computing system 120, there may be instances when the user of the computing system 110 has a need to access a secure site 116 that is protected by the password 118. Examples of the secure site 116 include, but are not limited to, a webpage or a secured computing system window or screen. For example, the user of computing system 110 may have a need to access a bank account, medical records, or other sensitive information via the secure site 116 during the video communication session. Alternatively, the user of the computing system 110 may simply desire to access the bank account, medical records, or other sensitive information via the secure site 116 for personal reasons during the video communication session. In either case, the user of the computing system 110 would be prompted by the secure site 116 to enter the password 118 in order to gain access to the secure site 116 to access the desired sensitive information.

During the video communication session, the user of the computing system 110 generates audio sound 130 via the microphone 115 that is shared with the computing system 120. The audio sound 130 includes the voice communication that is naturally part of the video communication session between the computing systems. However, in some instances, the audio sound 130 also includes passwords keyboard sounds 132. That is, as previously described, each key of the keyboard 114 generates a unique acoustic sound as it is being used. Thus, the microphone 115 may pick up the acoustic sounds of the keyboard 114 as the password 118 is being entered into the secure site 116 by the user of the computing system 110. These acoustic sounds are then shared with the computing system 120 as part of the password keyboard sounds 132.

In some instances, the user of the computing system 120 may be a malicious party that wants to discover what letters, numbers, and/or symbols are included in the password 118. Accordingly, the computing system 120 includes a keyboard sound capture machine learning (ML) model 124. In operation, the keyboard sound capture ML model 124 is trained to identify which keys were being pressed on the keyboard 114 as the password 118 is being entered based on the password keyboard sounds 132. In other words, the keyboard sound capture ML model 124 recognizes the acoustic pattern of each key and based on this pattern, determines which key generated the acoustic pattern. The keyboard sound capture ML model 124 is then able to replicate the password 118 from the acoustic patterns. This is represented in FIG. 1 by the password 118 being included in the keyboard sound capture ML model 124. The malicious party can then use the password 118 to access the sensitive information in the secure site 116 without the knowledge or consent of the user of the computing system 110.

The embodiments disclosed herein provide for a mechanism to that runs on the local operating system of a computing system that is able to mitigate key sound stealing during video communication sessions. In particular, the embodiments disclosed herein provide for a keyboard sound mitigation agent that is able to monitor the computing system to learn when a user is about to input a password or other sensitive data that is input via a keyboard. In such case, the keyboard sound mitigation agent is able to automatically perform a keyboard sound mitigation operation. For example, the keyboard sound mitigation agent is able to automatically generate a random sound that hides any sounds being made by keystrokes entered by the user that might be picked up by the microphone. In alternative embodiments, the keyboard sound mitigation agent is able to automatically mute the microphone. Once the keyboard sound mitigation agent determines that the user is no longer inputting the password or other sensitive information, the random sound is automatically ended, or the microphone is automatically unmuted. Embodiments of the keyboard sound mitigation agent will now be explained in more detail.

Figure 2A:
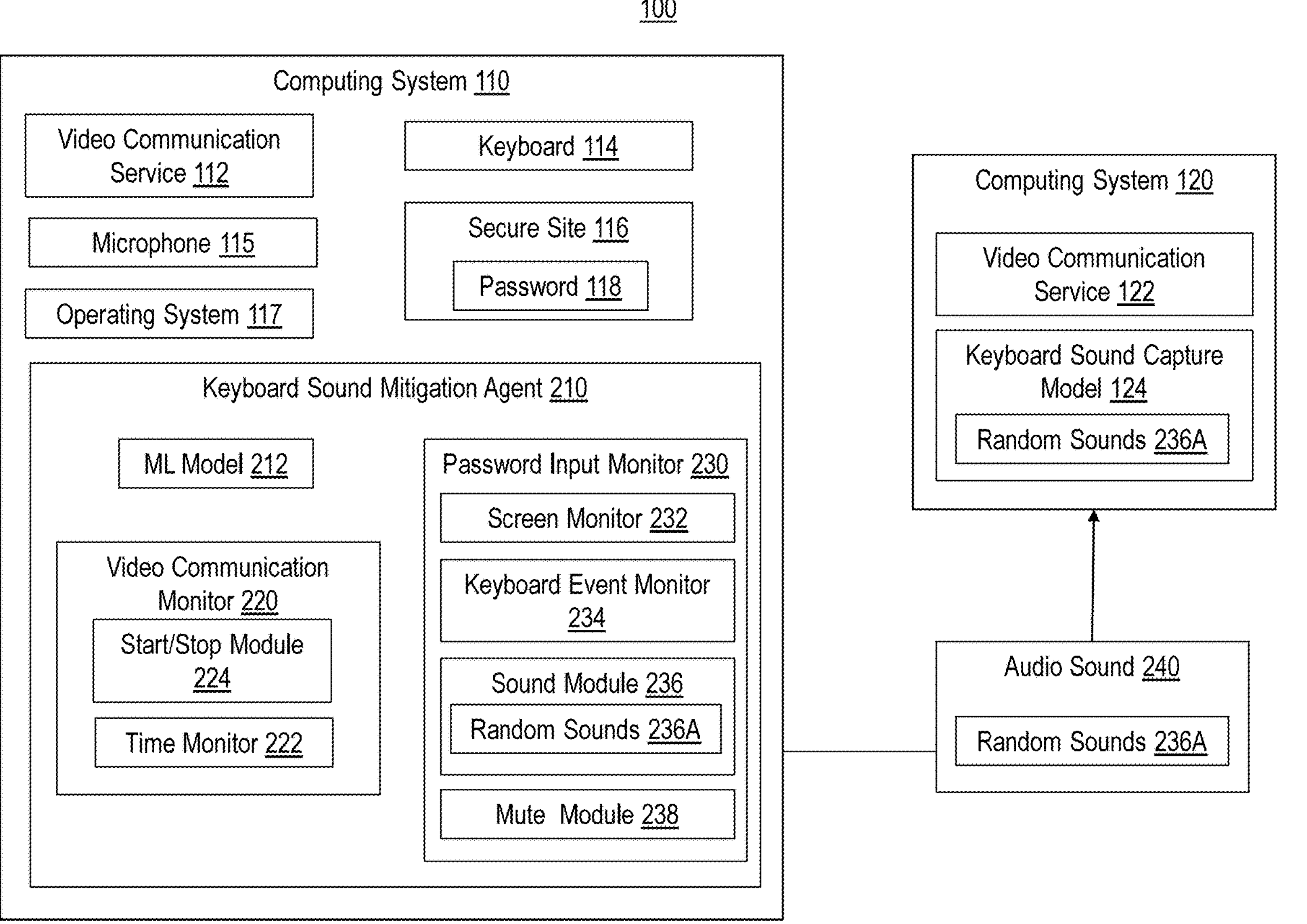
FIGS. 2A and 2B disclose aspects of a keyboard sound mitigation agent.

FIG. 2A illustrates an embodiment of the computing environment 100 previously described in relation to FIG. 1. Accordingly, elements previously described in relation to FIG. 1 need not be described in relation to FIG. 2A. As shown, in the embodiment of FIG. 2A the computing environment 100 now includes a keyboard sound mitigation agent or module 210. In the embodiment, the keyboard sound mitigation agent 210 runs on an operating system 117 of the computing system 110. It will be appreciated that the various functional blocks or modules of the keyboard sound mitigation agent 210 shown in the figures is for ease of illustration only. Thus, in some embodiments there may be more or less than the number shown in the figures as some of the modules may be combined or further divided.

In some embodiments, the keyboard sound mitigation agent 210 is implemented as a ML model 212. The ML model 212 may be any reasonable ML model such as, but not limited to, deep neural networks, convolutional neural networks, multilayer neural networks, recursive neural networks, logistic regressions, isolation forests, k-nearest neighbors, support vector machines (SVM), or any other reasonable machine-learning model. The ML model 212 can be trained to monitor the computing system 110 to learn when a user is about to input the password 118 or other sensitive data that is input via the keyboard 114 and when to generate the random sound or mute the microphone 115.

The keyboard sound mitigation agent 210 includes a video communication monitor 220. In operation, the video communication monitor 220 periodically monitors if the video communication service 112 is actively being used on the computing system 110. For example, in one embodiment the video communication monitor 220 iterates through the list of processes running on the operating system 117 and checks their names to see if any of the running processes match the video communication service 112. Thus, in an embodiment where the video communication service 112 is implemented as Zoom or as Microsoft Teams, the video communication monitor 220 would look for these names in the list of running processes. In some embodiments, the video communication monitor 220 also monitors the microphone 115 to determine if the microphone is enabled or otherwise turned on or is actively being used.

The video communication monitor 220 also includes a time monitor 222. The time monitor 222 is a configurable module that allows an interval to be set for how often the video communication monitor 220 monitors if the video communication service 112 is actively being used on the computing system 110. For example, in one embodiment the time monitor 222 may specify that the video communication monitor 220 initially monitors the list of running processes every 60 seconds when the video communication service 112 has not been running. However, if the video communication service 112 has been running, then the time monitor may specify that the list of running processes checked every 2 seconds.

The video communication monitor 220 also includes a start/start module 224. In operation, once the video communication monitor 220 determines that video communication service 112 is actively being used on the computing system 110 and that the microphone 115 is actively engaged, the start/start module 224 will enable the other functional blocks or modules of the keyboard sound mitigation agent 210, in particular a password input monitor 230 as will be explained in more detail. However, when the video communication monitor 220 determines that video communication service 112 is not actively being used on the computing system 110 and/or that the microphone 115 is not actively engaged, the start/start module 224 will turn off the other functional blocks or modules of the keyboard sound mitigation agent 210, in particular the password input monitor 230 as will be explained in more detail.

Shown below is an example of pseudocode that can be used in one embodiment to implement portions of the keyboard sound mitigation agent 210 including the video communication monitor 220. It will be appreciated that although the pseudocode uses Zoom or Teams, this is only for illustrative purposes only and any type of video communication service 112 can be used.

```
import psutil
import time
#Function to check if Zoom or Teams process is running every 2 seconds
def is_zoom_or_teams_running( ):
  for process in psutil.process_iter(attrs=['pid', 'name']):
    if 'zoom.exe' in process.info['name'].lower( ) or 'teams.exe'
  inProcess.info['name'].lower( ):
      return True
    return False
#Check for Zoom or Teams every 60 seconds
while True:
  if is_zoom_or_teams_running( ):
  print("Zoom or Teams is running!")
   #Start the custom service or take other actions
  else:
    print("Zoom or Teams is not running")
    #Stop the custom service or take other actions here
    time.sleep(5) #Check every 5 seconds. Can be altered also.
```

Shown below is an example of pseudocode that can be used in one embodiment to implement portions of the start/stop module 224.

```
#Start the custom service
def start_custom_service( ):
  try:
    # Start your custom service or application
     subprocess.Popen({/path/of/the/custom/service"])
     print("Custom service started")
     except Exception as e:
     print(f"Error starting custom service: {e}")
//Logic to detect when the user will enter password
```

The keyboard sound mitigation agent 210 includes a password input monitor 230. In operation, the password input monitor is able to determine when the user of the computing system 110 is entering the password 118 using the keyboard 114 to gain access to the secure site 116. In some embodiments, the password input monitor 230 is also able to monitor for the input of other types of sensitive information using the keyboard 114 such as medical or health information, bank account or other financial information, or personal identification information such as social security number or driver's license number that is being input by the user of the computing system 110 during a video communication session.

In some embodiments, the password input monitor 230 includes a screen monitor 232. In operation, the screen monitor 232 scans an open webpage or its underlying HTML structure or scans an active computer window to determine if there is any indication of the need to input the password 118 or to input other sensitive information. For example, an active webpage could have a password field that indicates the need to enter the password 118. Alternatively, the active webpage may include keywords such as "password", "username", "enter", "private", secured" that are indicative that a password or other sensitive information will need to be entered. The active webpage may also have underlying HTML including statements such as: <input type="password", id="passwordInput", |name="password"> that are indicative that a password or other sensitive information will need to be entered. In addition, the active webpage may have one or more fields that indicate the need to enter the sensitive information. For example, the webpage may be the webpage of the user's bank or other financial institution.

Likewise, an active computer window may also have fields that indicate the need to enter the password 118 or the sensitive information and/or may include keywords such as "password", "username", "enter", "private", secured" that are indicative that a password or other sensitive information will need to be entered. For example, an active window may include health related documents that the user of the computing system 110 is editing during the video communication session.

In addition, the screen monitor 232 is able to determine if the user of the computing system 110 has accessed a password field or sensitive information field. For example, the screen monitor 232 is able to detect when a mouse of the computing system 110 enters the password field or sensitive information field, thus indicating that the user of the computing system 110 is likely to enter the password or other sensitive information.

In some embodiments, the password input monitor 230 includes a keyboard event monitor or listener 234. In operation, the keyboard event monitor 234 detects keyboard events such as detecting a key code for each key of the keyboard 114 that is pressed in a password field or in a field for entering sensitive information of the webpage or a computer window. In other words, the keyboard event monitor 234 is used to detect once a keystroke is made in the password or sensitive information field or is made elsewhere in the webpage or computer window.

Shown below is an example of pseudocode that can be used in one embodiment to implement portions of the keyboard event monitor 234.

```
document.addEventListener("keydown",function(event){
  try{
    var focusedElement=document, activeElement;
    var isPasswordField=focusedElement.type ==="password";
    var isFirstKey = event.keyCode!==9 && event.keyCode!==16 &&
  event.keyCode!==20;
  if (isPasswordField && isFirstKey) {
    //perform desired action, like playing a random sound on key press
    //console.log("User enters password on screen")
  }
}Catch (error){
  console.error("Error occured:"error);
  //this is exception handling
  }
});
```

In the above code, event.keycode represents the key code that triggered the event. In the above code, event.keycode!==9 checks if the key code is not equal to 9. Key code 9 corresponds to the "Tab" key. This condition ensures that code block does not run when the user of the computing system 110 simply tabs into the password or sensitive information field. In the above code, event.keycode!==16 checks if the key code is not equal to 16. Key code 16 corresponds to the "Shift" key. This condition ensures that code block does not run when the user of the computing system 110 holds the shift key while typing. In the above code, event.keycode!==20 checks if the key code is not equal to 20. Key code 20 corresponds to the "Caps Lock" key. This condition ensures that code block does not run when the user of the computing system 110 holds activates the Caps Lock key.

In some embodiments, the password input monitor 230 includes a sound module 236. In operation, the sound module 236 is able to automatically generate random sounds 236A, which is an example of a keyboard sound mitigation operation, whenever the screen monitor 232 determines that the user of the computing system 110 has entered a password field and/or a sensitive data field, for example by use of a mouse of the computing system. Alternatively, or in addition to, the sound module 236 is able to generate random sounds 236A whenever the keyboard event monitor 234 detects a keyboard event in the password field and/or the sensitive data field. The random sounds 236A are sounds that mask any acoustic sound made by a key of the keyboard 114 as the key is being used to enter the password 118 or the other sensitive information.

In some embodiments, the sound module 236 uses random system sounds that are included in or provided by the operating system 117. For example, if the operating system 117 is Microsoft Windows, then the sound module 236 would use the sounds that are included in Windows when generating the random sounds 236A, for example a system default beep sound or system music. In other embodiments, the sound module 236 may use sounds that are taken from other sources such as webpages or a predefined library of sounds when generating the random sounds 236A. In still other embodiments, the sound module 236 may be able to generate its own random sounds 236A. Accordingly, the embodiments disclosed herein are not limited to any particular type or source for the random sounds 236A.

Shown below is an example of pseudocode that can be used in one embodiment to implement portions of the sound module 236 when using the included sounds of the Windows operating system.

```
import winsound
#List of Windows system sound names or aliases
system_sounds = [
      'SystemAsterisk',
      'SystemExclamation',
      'SystemExit',
      'SystemHand',
      'SystemQuestion',
   'SystemDefault', #This is the Default beep sound
]
#below is the function to play all system sounds
def play_random_system_sounds( ):
      for sound_alias in system_sounds:
         winsound.PlaySound(sound_alias,winsound.SND_ALIAS)
//Call function
play_random_system_sounds( )
```

During a video communication session between the computing system 110 and the computing system 120, the user of the computing system 110 generates audio sound 240 via the microphone 115 that is shared with the computing system 120. The audio sound 240 includes the voice communication that is naturally part of the video communication session between the computing systems. However, unlike the audio sound 130 of FIG. 1 that included the password keyboard sounds 132 that could be used by the keyboard sound capture model 124 to replicate the password 118 or other inputted sensitive information, the audio sound 240 only includes the random sounds 236A. Thus, any password keyword sounds 132 generated while the user of computing system 110 inputs the password 118 or any other sensitive information is masked by the random sounds 236A. Accordingly, the keyboard sound capture model 124 is not able to replicate the password 118 or the other sensitive information using any keyboard sounds that are captured during the video communication session since it would only have access to the random sounds 236A.

Figure 2B:
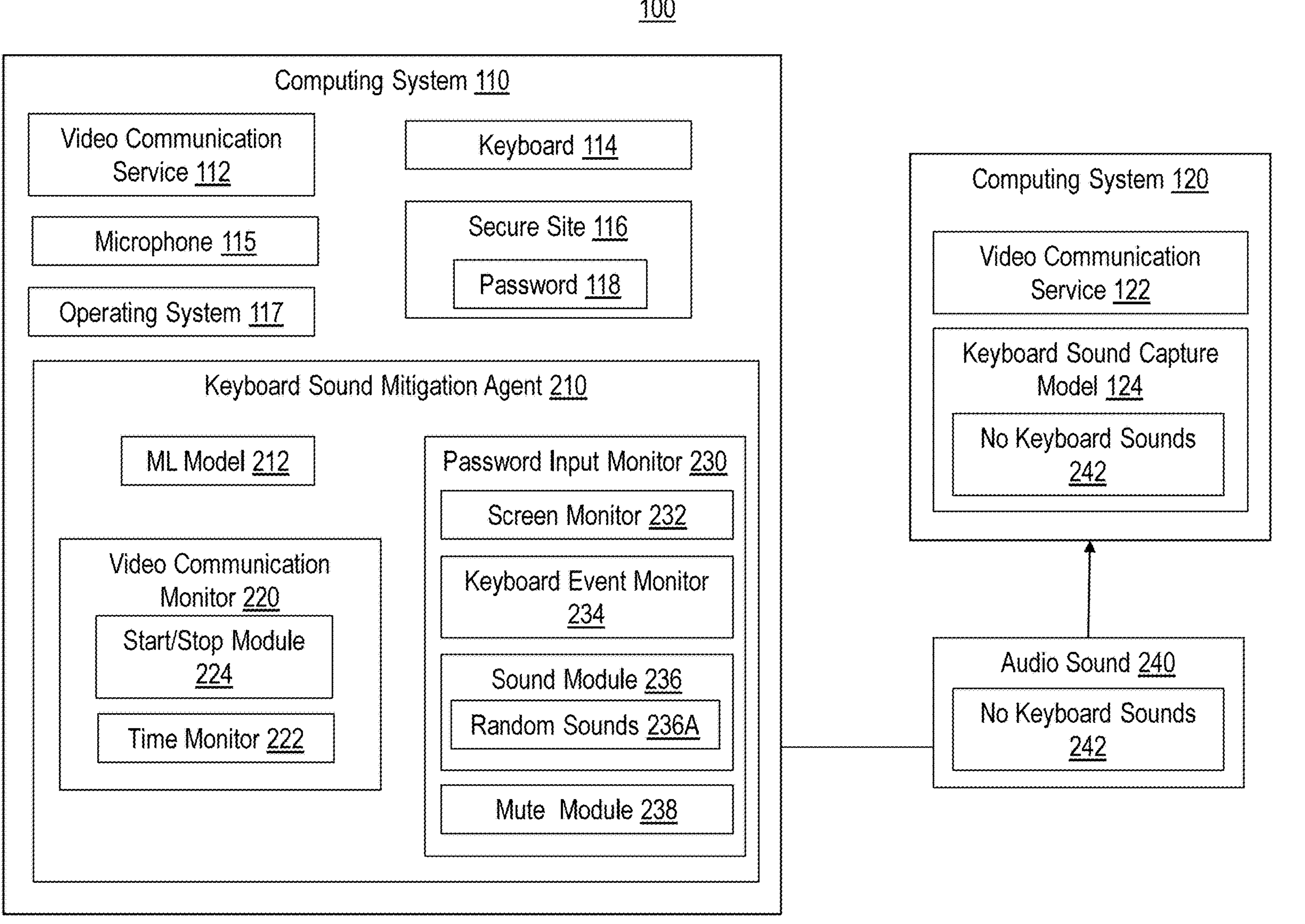

In some embodiments, the password input monitor 230 includes a mute module 238 in addition to, or alternatively to, the sound module 236. In operation, the mute module 238 is able to automatically mute the microphone 115, which is an example of a keyboard sound mitigation operation, whenever the screen monitor 232 determines that the user of the computing system 110 has entered a password field and/or a sensitive data field, for example by use of a mouse of the computing system. Alternatively, or in addition to, the mute module 238 is able to mute the microphone 115 whenever the keyboard event monitor 234 detects a keyboard event in the password field and/or the sensitive data field. It will be noted that although FIGS. 2A and 2B show both the sound module 236 and the mute module 238, this is for ease of explanation only. Thus, in some embodiments, the password input module will include only the sound module 236, in other embodiments will include only the mute module 238, and still in other embodiments will include both the sound module 236 and the mute module 238.

During a video communication session between the computing system 110 and the computing system 120, the user of the computing system 110 generates the audio sound 240 via the microphone 115 that is shared with the computing system 120. As discussed previously, audio sound 240 includes the voice communication that is naturally part of the video communication session between the computing systems. However, unlike the audio sound 130 of FIG. 1 that included the password keyboard sounds 132 that could be used by the keyboard sound capture model 124 to replicate the password 118 or other inputted sensitive information, the audio sound 240 in the embodiment of FIG. 2B would include no keyboard sounds as shown at 242. Thus, any password keyword sounds 132 generated while the user of computing system 110 inputs the password 118 or any other sensitive information would not be picked up in the audio sound 240 since the microphone 115 is muted. Accordingly, the keyboard sound capture model 124 is not able to replicate the password 118 or the other sensitive information using any keyboard sounds that are captured during the video communication session since no keyboard sounds would be provided as shown at 242.

Figure 3:
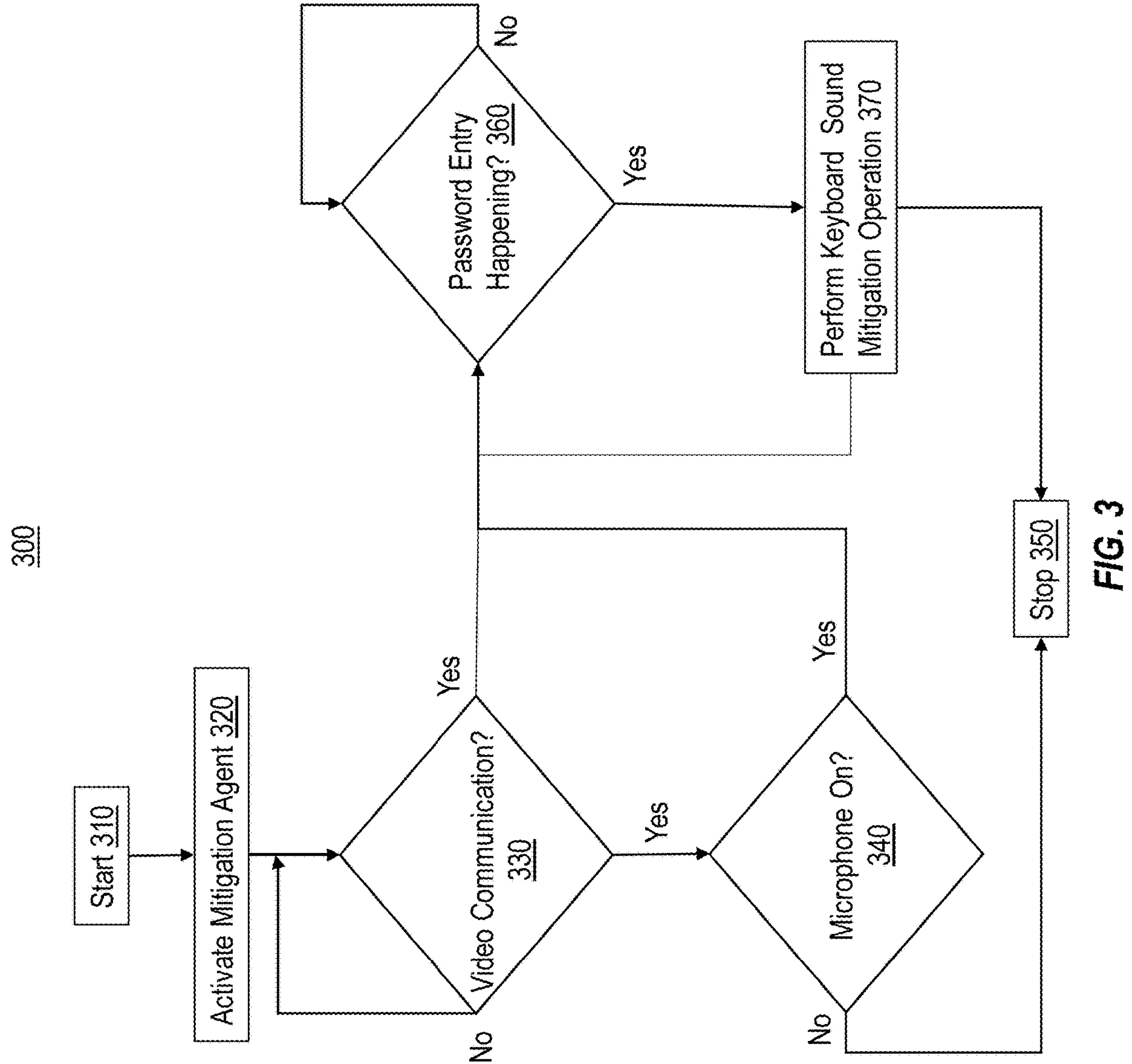
FIG. 3 discloses aspects process flow according to an embodiment.

FIG. 3 illustrates a process 300 of the keyboard sound mitigation agent 210. The process starts at step 310. Prior to start 310, the keyboard sound mitigation agent 210 is installed on the computing system 110 and then initialized to detect the operating system 117. In some embodiments, the computing system 110 requests permission from the user of the computing system 110 for permission to run the keyboard sound mitigation agent 210, at least for the first time the agent is run. In other embodiments, the keyboard sound mitigation agent 210 will run automatically after it has been installed. After the process is started at 310, the keyboard sound mitigation agent 210 is automatically activated at step 320.

At decision block 330, the video communication monitor 220 checks to see if the user of the computing system 110 is actively using the video communication service 112 during a video communication session with the computing system 120. If the user of the computing system 110 is actively using the video communication service 112 (Yes in decision block 330), the process moves to decision block 340. In some embodiments, the decision block 340 is skipped and the process moves to decision block 360 at a Yes in decision block 330. However, if the user of the computing system 110 is not actively using the video communication service 112 (No in decision block 330), the video communication monitor 220 will continuously check to see when the video communication service 112 is being used. As previously described, the time monitor 222 allows an interval to be set for how often the video communication monitor 220 monitors if the video communication service 112 is actively being used on the computing system 110.

At decision block 340, the video communication monitor 220 checks to see if the microphone 115 is enabled or otherwise turned on or is actively being used. If the microphone 115 is not currently turned on or is muted and thus not enabled (No in decision block 340) the process stops 350. In other words, if the microphone 115 is muted or otherwise not tuned on, the process will not continue because there is no chance that any of the password keyboard sounds 132 will be provided to the computing system 120.

If the microphone 115 is currently turned on and enabled (Yes in decision block 340) the process moves to decision block 360. That is, the start/start module 224 enables the password input monitor 230 to function as previously described.

At decision block 360, the password input monitor 230 checks to see if the user of the of the computing system 110 is entering the password 118 or is entering the other types of sensitive information. As previously described, the screen monitor 232 scans an open webpage or its underlying HTML structure or scans an active computer window to determine if there is any indication of the need to input the password 118 or to input other sensitive information. In addition, or alternatively to, the keyboard event monitor 234 detects keyboard events such as detecting a key code for each key of the keyboard 114 that is pressed in a password field or in a field for entering sensitive information of the webpage or a computer window.

If the password input monitor 230 does not determine that the user of the of the computing system 110 is entering the password 118 or is entering the other types of sensitive information (No in decision block 360), the password input monitor 230 continually monitors for keyboard events or for screen indications showing a need to enter the password 118 or the other sensitive information. However, if the password input monitor 230 does determine that the user of the of the computing system 110 is entering the password 118 and/or is entering the other types of sensitive information (Yes in decision block 360), the process moves to step 370.

At step 370, the password input monitor 230 performs a keyboard sound mitigation operation. In those embodiments implementing the sound module 236, the sound module 236 generates the random sounds 236A in the manner previously described. In the embodiments implementing the mute module 238, the mute module 238 mutes the microphone 115 in the manner previously described. As discussed previously, playing the random sounds 236A and muting the microphone 115 during the process 300 are examples of the keyboard sound mitigation operation.

The password input monitor 230 will continue to play the random sounds 236A and/or mute microphone 115 during step 370 while the user of the computing system 110 continues to enter the password 118 and/or the other types of sensitive information. Once the user of the computing system 110 moves out from a password field or other sensitive information field, the password input monitor 230 will stop playing the random sounds 236A and/or will unmute the microphone 115.

The process will return to decision block 360 as the password input monitor 230 will continuously checks to see if the user of the of the computing system 110 is entering the password 118 or is entering the other types of sensitive information while the video communication service 112 is actively being used during the video communication session with the computing system 120. If the user leaves or ends the video communication session with the computing system 120 and is thus no longer actively using the video communication service 112, the process stops 350.

Following are some further example embodiments of the invention. These are presented only by way of example and are not intended to limit the scope of the invention in any way.

Embodiment 1. A comprising: automatically determining, at a keyboard sound mitigation model implemented on a first computing system, if the first computing system is actively running a video communication service during a video communication session with a second computing system; in response to determining that the first computing system is actively running the video communication service during the video communication session with a second computing system, automatically determining, by the keyboard sound mitigation model, if a user of the first computing system is entering a password or sensitive information into a webpage or window that is active on the first computing system; and in response to determining that the user of the first computing system is entering the password or the sensitive information, performing, by the keyboard sound mitigation model, a keyboard sound mitigation operation that masks or removes any keyboard sounds made while entering the password or the sensitive information.

Embodiment 2. The method as recited in embodiment 1, further comprising: in response to determining that the first computing system is actively running the video communication service during the video communication session with the second computing system, and before determining that the user of the first computing system is entering the password or the sensitive information, automatically determining, by the keyboard sound mitigation model, if a microphone of the first computing system is actively turned on.

Embodiment 3. The method as recited in any of embodiments 1-2, wherein determining if the first computing system is actively running the video communication service during the video communication session with the second computing system comprises: iterating through a list of processes running on an operating system of the first computing system; and determining if any of the processes running on the operating system match a name of the video communication service.

Embodiment 4. The method as recited in any of embodiments 1-3, wherein the keyboard sound mitigation model determines if the first computing system is actively running a video communication service according to a timing monitor.

Embodiment 5. The method as recited in any of embodiments 1-4, wherein the keyboard sound mitigation operation comprises generating random sounds.

Embodiment 6. The method as recited in any of embodiments 1-5, wherein the random sounds are included in an operating system of the first computing system.

Embodiment 7. The method as recited in any of embodiments 1-6, wherein the keyboard sound mitigation operation comprises automatically muting a microphone of the first computing system.

Embodiment 8. The method as recited in any of embodiments 1-7, wherein determining that the user of the first computing system is entering the password, or the sensitive information comprises: scanning the active webpage or window to find password input fields or sensitive information input fields.

Embodiment 9. The method as recited in any of embodiments 1-8, wherein determining that the user of the first computing system is entering the password, or the sensitive information comprises: scanning the underlying HTML code of the webpage for statements that are indicative of entering a password.

Embodiment 10. The method as recited in any of embodiments 1-9, wherein determining that the user of the first computing system is entering the password, or the sensitive information comprises: monitoring one or more keyboard events.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to conduct executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
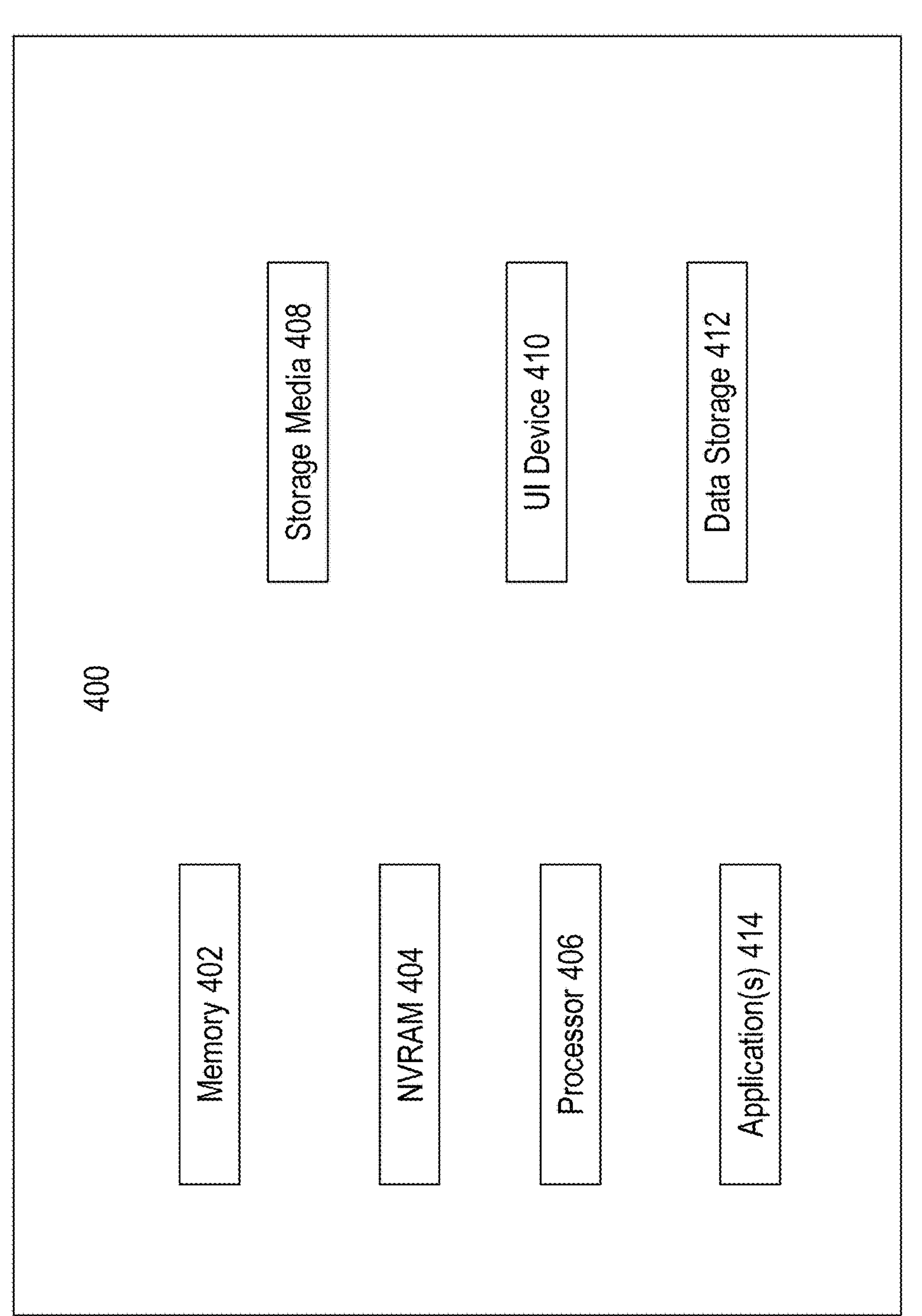
FIG. 4 discloses an example computing entity configured to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

automatically determining, at a keyboard sound mitigation agent that is implemented on a first computing system, if the first computing system is actively running a video communication service during a video communication session with a second computing system;

automatically determining, by a video communication monitor of the keyboard sound mitigation agent, whether a microphone of the first computing system is actively enabled, and enabling a password input monitoring function of the keyboard sound mitigation agent only when both (i) the video communication service is actively running and (ii) the microphone is actively enabled;

in response to determining that the first computing system is actively running the video communication service during the video communication session with a second computing system and that the password input monitoring function is enabled, automatically determining, by the keyboard sound mitigation agent, that a user of the first computing system is entering a password or sensitive information into a webpage or window that is active on the first computing system, wherein determining that the user is entering the password or sensitive information comprises (i) scanning the active webpage or window to detect a password input field or sensitive information input field, (ii) detecting that a cursor or user input focus has entered the password input field or sensitive information input field, and (iii) detecting entry of an initial keyboard event in the password input field or sensitive information input field; and in response to determining that the user of the first computing system is entering the password or the sensitive information, performing, by the keyboard sound mitigation agent, a keyboard sound mitigation operation that masks or removes any keyboard sounds made while entering the password or the sensitive information, wherein the keyboard sound mitigation operation is initiated upon detection of the initial keyboard event and is terminated upon detecting that the cursor or user input focus exits the password input field or sensitive information input field, and wherein the keyboard sound mitigation operation is performed only while the microphone remains actively enabled.

2. The method of claim 1, further comprising:

in response to determining that the first computing system is actively running the video communication service during the video communication session with the second computing system, and before determining that the user of the first computing system is entering the password or the sensitive information, automatically determining, by the keyboard sound mitigation agent, if a microphone of the first computing system is actively turned on, and enabling or disabling a password input monitoring function of the keyboard sound mitigation agent based on whether the microphone is actively turned on, wherein disabling the password input monitoring function prevents scanning of the active webpage or window and monitoring of keyboard events.

3. The method of claim 1, wherein determining if the first computing system is actively running the video communication service during the video communication session with the second computing system comprises:

iterating through a list of processes running on an operating system of the first computing system; and determining if any of the processes running on the operating system match a name of the video communication service.

4. The method of claim 1, wherein the keyboard sound mitigation model determines if the first computing system is actively running a video communication service according to a timing monitor.

5. The method of claim 1, wherein the keyboard sound mitigation operation comprises generating random sounds.

6. The method of claim 5, wherein the random sounds are included in an operating system of the first computing system.

7. The method of claim 1, wherein the keyboard sound mitigation operation comprises automatically muting a microphone of the first computing system.

8. The method of claim 1, wherein determining that the user of the first computing system about to enter the password, or the sensitive information comprises:

scanning the active webpage or window to find password input fields or sensitive information input fields and detecting that a cursor or user input focus has entered the password input field prior to detecting the initial keyboard event, wherein the keyboard sound mitigation operation is not initiated solely based on detecting the password input field or the cursor entering the password input field.

9. The method of claim 1, wherein determining that the user of the first computing system is about to enter the password, or the sensitive information comprises:

scanning underlying HTML code of the webpage for statements that are indicative of entering a password.

10. The method of claim 1, wherein determining that the user of the first computing system is entering the password, or the sensitive information comprises:

monitoring one or more keyboard events and identifying an initial keystroke in a password input field as a trigger for initiating the keyboard sound mitigation operation, wherein non-character key events are excluded from triggering the keyboard sound mitigation operation.

11. A non-transitory storage medium having stored therein instructions that are executable by one or more hardware processors to perform operations comprising:

automatically determining, at a keyboard sound mitigation agent that is implemented on a first computing system, if the first computing system is actively running a video communication service during a video communication session with a second computing system;

automatically determining, by a video communication monitor of the keyboard sound mitigation agent, whether a microphone of the first computing system is actively enabled, and enabling a password input monitoring function of the keyboard sound mitigation agent only when both (i) the video communication service is actively running and (ii) the microphone is actively enabled;

in response to determining that the first computing system is actively running the video communication service during the video communication session with a second computing system and that the password input monitoring function is enabled, automatically determining, by the keyboard sound mitigation agent, that a user of the first computing system is entering a password or sensitive information into a webpage or window that is active on the first computing system, wherein determining that the user is entering the password or sensitive information comprises (i) scanning the active webpage or window to detect a password input field or sensitive information input field, (ii) detecting that a cursor or user input focus has entered the password input field or sensitive information input field, and (iii) detecting entry of an initial keyboard event in the password input field or sensitive information input field; and in response to determining that the user of the first computing system is entering the password or the sensitive information, performing, by the keyboard sound mitigation agent, a keyboard sound mitigation operation that masks or removes any keyboard sounds made while entering the password or the sensitive information, wherein the keyboard sound mitigation operation is initiated upon detection of the initial keyboard event and is terminated upon detecting that the cursor or user input focus exits the password input field or sensitive information input field, and wherein the keyboard sound mitigation operation is performed only while the microphone remains actively enabled.

12. The non-transitory storage medium of claim 11, further comprising:

in response to determining that the first computing system is actively running the video communication service during the video communication session with the second computing system, and before determining that the user of the first computing system is entering the password or the sensitive information, automatically determining, by the keyboard sound mitigation agent, if a microphone of the first computing system is actively turned on, and enabling or disabling a password input monitoring function of the keyboard sound mitigation agent based on whether the microphone is actively turned on, wherein disabling the password input monitoring function prevents scanning of the active webpage or window and monitoring of keyboard events.

13. The non-transitory storage medium of claim 11, wherein determining if the first computing system is actively running the video communication service during the video communication session with the second computing system comprises:

iterating through a list of processes running on an operating system of the first computing system; and determining if any of the processes running on the operating system match a name of the video communication service.

14. The non-transitory storage medium of claim 11, wherein the keyboard sound mitigation model determines if the first computing system is actively running a video communication service according to a timing monitor.

15. The non-transitory storage medium of claim 11, wherein the keyboard sound mitigation operation comprises generating random sounds.

16. The non-transitory storage medium of claim 15, wherein the random sounds are included in an operating system of the first computing system.

17. The non-transitory storage medium of claim 11, wherein the keyboard sound mitigation operation comprises automatically muting a microphone of the first computing system.

18. The non-transitory storage medium of claim 11, wherein determining that the user of the first computing system about to enter the password, or the sensitive information comprises:

scanning the active webpage or window to find password input fields or sensitive information input fields and detecting that a cursor or user input focus has entered the password input field prior to detecting the initial keyboard event, wherein the keyboard sound mitigation operation is not initiated solely based on detecting the password input field or the cursor entering the password input field.

19. The non-transitory storage medium of claim 11, wherein determining that the user of the first computing system is about to enter the password, or the sensitive information comprises:

scanning underlying HTML code of the webpage for statements that are indicative of entering a password.

20. The non-transitory storage medium of claim 11, wherein determining that the user of the first computing system is entering the password, or the sensitive information comprises:

monitoring one or more keyboard events and identifying an initial keystroke in a password input field as a trigger for initiating the keyboard sound mitigation operation, wherein non-character key events are excluded from triggering the keyboard sound mitigation operation.

* * * * *